Sept. 14, 1937.　　　　A. C. PURPURA　　　　2,093,340

TOASTER

Filed Oct. 11, 1935　　　　2 Sheets-Sheet 1

INVENTOR.
August C. Purpura
BY
Rasmussen & Brugman
ATTORNEYS.

Sept. 14, 1937.　　　A. C. PURPURA　　　2,093,340
TOASTER
Filed Oct. 11, 1935　　　2 Sheets-Sheet 2

INVENTOR.
August C. Purpura
BY
Rasmussen & Brugman
ATTORNEYS.

Patented Sept. 14, 1937

2,093,340

UNITED STATES PATENT OFFICE 2,093,340

TOASTER

August C. Purpura, Chicago, Ill.

Application October 11, 1935, Serial No. 44,581

3 Claims. (Cl. 219—19)

This invention relates in general to cooking appliances, and has more particular reference to an electric toaster and timing mechanism therefor.

A principal object of the invention is the provision of an electric toaster having a plurality of pivotally mounted bread carrying racks, any one of which in being moved into operative position will automatically close a switch in the heating element circuit.

Another important object of the invention is the provision in such a toaster of mechanism adapted to be manually operated to move any of the bread carrying racks out of the heating zone and at the same time open the switch in the heating element circuit.

Another important object of the invention is the provision of a timing mechanism adapted to be set to bring into operative position any one of a plurality of elements, each of which will indicate the passing of a different predetermined time interval.

A further important object of the invention is the provision of such a timing mechanism which comprises a supporting element upon which are mounted a plurality of time measuring members and which is adapted to be moved to bring a desired member into operative position.

Numerous other objects and advantages of the invention will be apparent as it is better understood from the following description, which, when taken in connection with the accompanying drawings, discloses a preferred embodiment thereof.

Figure 1:
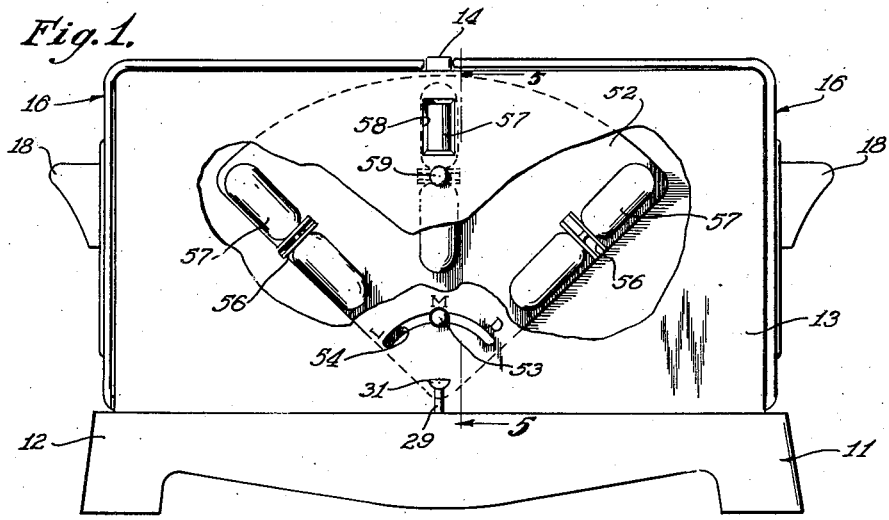
Figure 1 is a side elevation of a toaster embodying my present invention, with part of the outer casing broken away.

Referring more particularly to the drawings, reference numeral 11 indicates in general a casing, comprising a hollow base member 12, upstanding frame or wall members 13 rigidly mounted thereon in any suitable manner to provide any number of recesses extending lengthwise of the casing and having the top and ends thereof open, and a cross tie member 14 extending across the top of the casing and rigidly secured to the wall members 13 in any suitable manner. The casing 11 may be of any desired shape and constructed in any suitable manner from sheet metal or the like.

Pivotally mounted at 15 adjacent the lower outer ends of each of the longitudinal recesses provided in the casing is a bread carrying rack or closure member, generally indicated at 16. Two opposing members 16 are thus mounted in each of the longitudinally extending recesses so that in closed position (as shown in Fig. 2) the outer surfaces of these members will be substantially flush with the top and end surfaces of the casing, and together with the cross tie member 14 will completely close their respective longitudinal recess.

Each closure member 16 is provided with an inwardly extending bread carrying rack 17, a suitable handle 18, and a tail piece or clip 19 extending through the horizontal wall of the base member 12. A suitable coil spring 21 is secured at one end to the lower end of the clip 19 and at its other end to a bracket 22 mounted on the base member 12. A heating element 23 of well-known construction is mounted in a vertical plane within the casing in the usual manner along each side of each horizontal recess and pair of members 16.

It will be readily apparent that any number of pairs of members 16 may be provided in parallel relationship to each other. Since each rack 16 will accommodate one slice of bread, the above described arrangement may be used to provide toasters having two-slice, four-slice, six-slice, etc., capacity. If desired, two or more bread racks or closure members 16 which are adjacent each other sideways of the casing may be interconnected in any suitable manner to form a single bread carrying unit at each end of the casing. With such an arrangement, only one clip 19 need be provided for each unit, as shown in Fig. 4.

Figure 2:
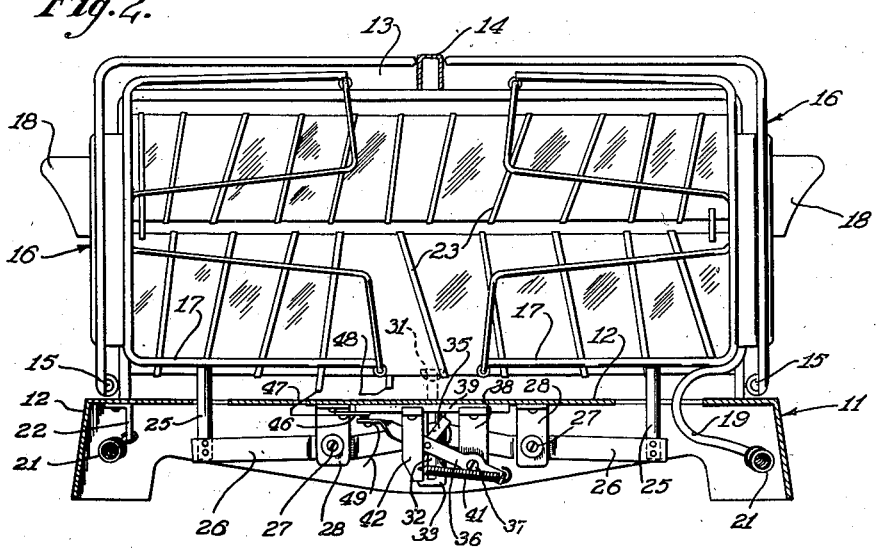
Fig. 2 is a view similar to Fig. 1, with one side of the outer casing removed and parts shown in section, the movable parts being in closed or operative position.
Figure 5:
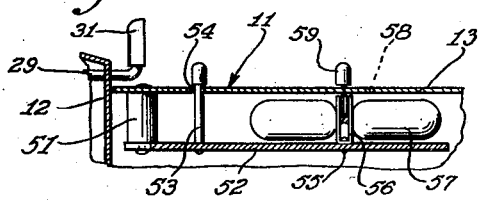
Fig. 5 is a detail vertical section taken substantially on the line 5—5 of Fig. 1.
Figure 3:
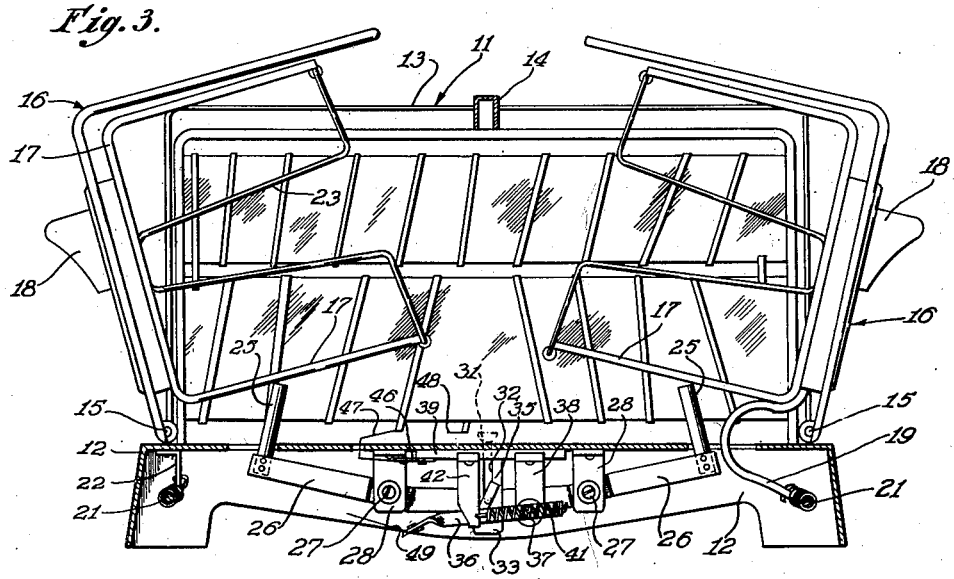
Fig. 3 is a view similar to Fig. 2 showing the movable parts in open or inoperative position.
Figure 4:
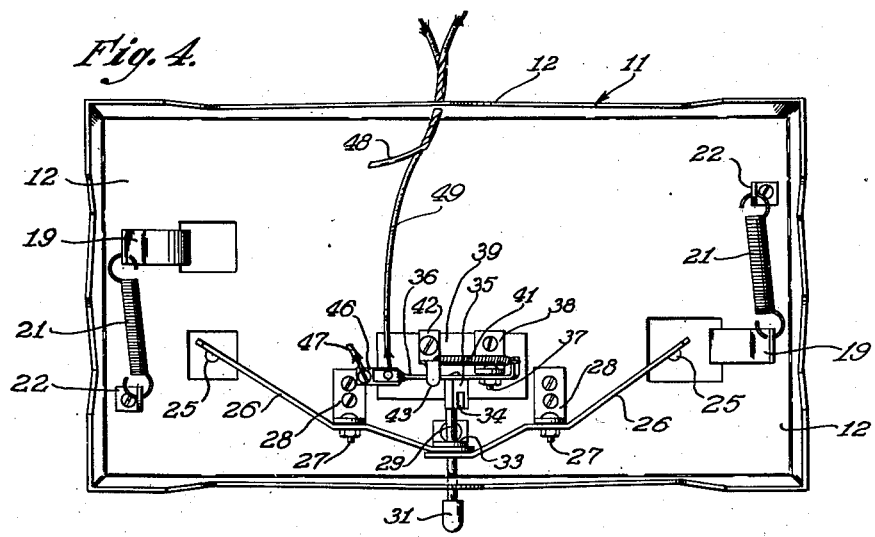
Fig. 4 is a bottom plan view with the parts in their positions of Figs. 1 and 2.

Extending upwardly through a suitable opening in the horizontal wall of the base member 12 is an actuating rod 25, one of which is provided for each closure member 16, or each end unit of interconnected closure members 16, the upper end of each rod abutting against the lower surface of its associated closure member 16 (Figs. 2 to 4). The lower end of each rod 25 is rigidly secured to the outer end of one arm of a link 26 which is pivoted at 27 on a depending bracket 28 mounted on the lower surface of the horizontal wall of the base 12. The inner ends of the inner arms of the levers 26 overlap each other and are each provided with a slot through which the lower horizontal end of a crank-shaped lever or rod 29 extends. The vertical arm of the rod 29 extends upward through the base 12 (Fig. 5), and the upper horizontal end of the rod comprises a forwardly extending finger piece 31.

Adjacent the inner ends of the levers 26, the lower horizontal end of the rod 29 extends through a vertical guide slot 32 in a bracket 33 secured to and depending from the base 12. The extreme inner end of the lower horizontal portion of the rod 29 extends into a slot or recess 34 (Fig. 4) in an insulating block 35. The block 35 is secured to a switch arm 36 which is pivoted intermediate its ends at 37 to a bracket 38 secured to an insulating plate or block 39 which is in turn secured to the under side of the horizontal wall of the base 12.

A suitable coil spring 41 is secured at one end to the tail of the switch arm 36 and at its other end to a bracket 42 secured to and depending from the insulating plate 39. The bracket 42 is provided with a horizontal tail piece 43 (Fig. 4) which acts as a stop for limiting downward movement of the switch arm 36 (Fig. 3).

The free end of the switch arm 36 is adapted in its uppermost position (Figs. 2 and 4) to engage a contact plate 46 which is electrically connected as by means of a conductor 47 to one end of the heating element 23. The other end of the heating element, or the free end of one of the heating elements, which are interconnected if more than one is used, is connected to one side 48 of the usual cord or other suitable source of electric current. The other side of the cord 49 is connected to the free end of the switch arm 36.

The mechanism above described operates in the following manner: With current in the line 48, 49, the movable parts of the toaster will normally be in the positions shown in Fig. 3. To insert slices of bread into one or more of the members 16, the latter may be swung to a completely open position with their end walls in a substantially horizontal plane. Upon moving any one or all of the members 16 to closed position, as shown in Figs. 1 and 2, the slice or slices of bread carried thereby are brought into the heating zone of the elements 23, and the first member 16 that is moved to closed position will close the switch 36, 46 to complete the circuit through the heating element or elements 23.

The two levers 26, by means of their pivotal mounting at 27 and the engagement of the rod 29 with the slots in their inner ends, will operate together to raise the rod 29 in the vertical guide slot 32 upon either one of them being moved from the position of Fig. 3 to the position of Fig. 2 by a closure member 16. The springs 21 will normally maintain the lower surface of their respective closure members 16 in engagement with the associated rod 25, but they are not sufficiently strong to move the levers 26 from their off-center position of Fig. 3. Due also to the particular arrangement of the parts, if the levers 26 have been moved to their position of Fig. 2, the closure members 16 may be readily swung to open position by means of handles 18 without in any way affecting the levers 26 or switch mechanism.

Upward movement of the rod 29 will close the switch 36, 46 through the intermediary of block 35, and the spring 41 will tend to maintain the switch arm 36 in contact with the plate 46 and the levers 26 in their upper off-center position, as seen in Fig. 2.

At the end of the desired cooking period, the operator may move the bread carrying members 16 to their position of Fig. 3 and open the switch 36, 46 by merely pressing down on the finger piece 31 to lower the rod 29. The springs 21 will maintain the members 16 in this partially open position to keep the toast warm. If it is desired, the points of attachment of the springs 21 may be so arranged relative to the hinge points 15 that a toggle effect will be provided so that a sharp movement of the rods 25 upwardly will move the members 16 to completely open position and the springs 21 will counteract against any rebound, while these springs will still act to urge the members 16 against their respective rods 25 when in the positions of Figs. 3 or 2.

In order to give an indication of the end of any one of a plurality of predetermined time intervals, the following mechanism is provided (Figs. 1 and 5): Pivotally mounted in the casing 11, at 51 behind the front wall thereof (Fig. 5), is a segmental plate 52 which is provided with an actuating rod or handle 53 extending forwardly through a suitable arcuate slot 54 in the casing wall. Rotatably mounted in the plate 52 in spaced angular relationship at 55, at the same radial distance from the point 51, are a plurality of U-shaped supporting frame members 56. Rigidly mounted in any suitable manner on each frame member 56 is a measuring glass 57 in the shape of an hour glass.

Each glass 57 is filled with sand, mercury, or the like, and the different glasses are provided with different materials or varying sized connecting apertures between their two portions, so that when that portion containing the material adapted to flow through the connecting aperture is brought into the upper position, it will take different predetermined lengths of time for it to flow therefrom in each glass. It will thus be apparent that by selection of a given measuring glass, the desired predetermined time interval will be accurately indicated. The materials used in the several glasses 57 may be differently colored as a means of identification.

The front wall of the casing 11 is provided with a suitable sight aperture 58 so located as to give visual access to the upper portion of a measuring glass which is positioned with its axis supporting frame 56 in a vertical line passing through the pivotal axis 51. Rotatably mounted in the front wall of the casing 11 at a point on this same line at a radial distance from the pivot point 51 equal to that of the pivot points 55 of the frames 56 is an actuating member 59. Adjacent the slot 54 the front wall of the casing 11 is provided with suitable indicating markings, such as "L", "M" and "D" in Fig. 1, which are angularly spaced from each other at equal distances to the angular spacings between the measuring glasses 57.

To select the measuring glass which is so made up as to give an indication of a predetermined time interval of desired duration, the operator merely swings the handle 53 opposite the desired indicating marking on the casing to bring the proper glass 57 in a position with its upper portion in line with the sight opening 58. In moving into such position the open end of the U-shaped frame member 56 of the selected glass 57 will embrace the inner end of the actuating member 59 which is preferably flattened out or substantially elliptical in cross section.

Having selected the desired measuring glass 57, rotation of the actuating member 59 through 180 degrees will reverse or rotate the measuring glass so that the portion containing the measuring material will be brought into the upper position in line with the sight opening 58 and the glass will function in a well known manner.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an electric toaster having a heating element and a switch for controlling the flow of current thereto, a plurality of pivoted members for carrying bread and adapted to be separately moved into and out of the heating zone of said element, and means common to and operable by any one of said pivoted members in the movement thereof into the heating zone for closing said switch, said means being operable to simultaneously move all of said members out of said heating zone and open said switch.

2. In an electric toaster having a heating element and a switch for controlling the flow of current thereto, a plurality of pivoted members for carrying bread and adapted to be separately moved into and out of the heating zone of said element, means common to and operable by any one of said pivoted members in the movement thereof into the heating zone for closing said switch, and means associated with each of said members for moving a said member out of the heating zone without affecting said first named means.

3. In an electric toaster having a heating element and a switch for controlling the flow of current thereto, a plurality of pivoted members for carrying bread and adapted to be separately moved into and out of the heating zone of said element, means common to and operable by any one of said pivoted members in the movement thereof into the heating zone for closing said switch, said means being operable to simultaneously move all of said members out of said heating zone and open said switch, and means associated with each of said members for moving a said member out of the heating zone without affecting said first named means.

AUGUST C. PURPURA.